Aug. 20, 1929.    J. L. CREVELING    1,725,132
ELECTRIC REGULATION
Original Filed May 14, 1924
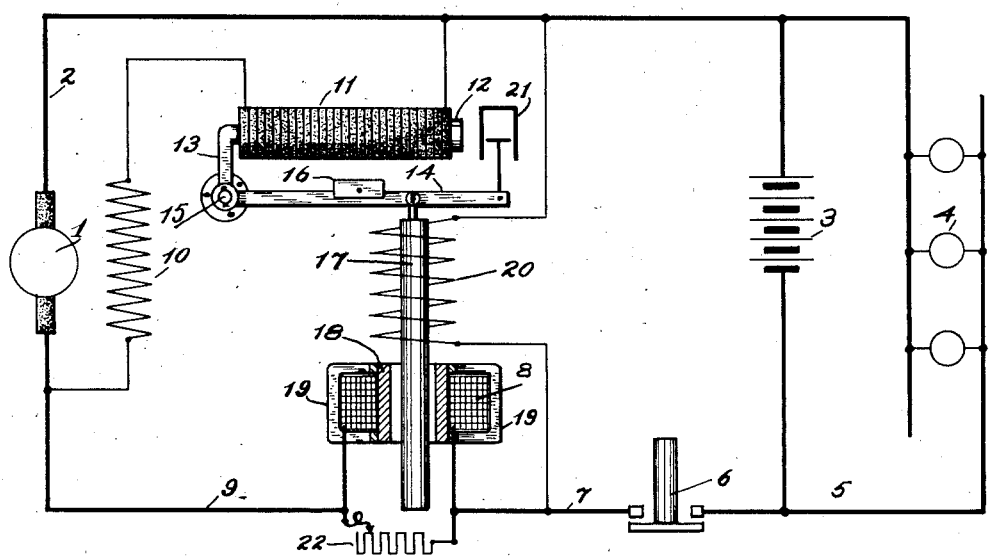
Fig. I.
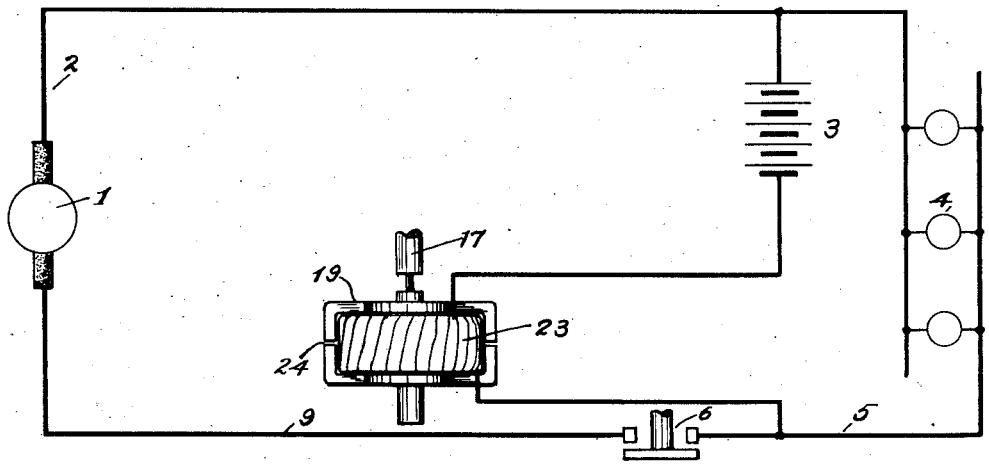
Fig. II.
INVENTOR.

Patented Aug. 20, 1929.

1,725,132

UNITED STATES PATENT OFFICE.

JOHN L. CREVELING, OF ORACLE, ARIZONA, ASSIGNOR, BY MESNE ASSIGNMENTS, TO SIMPLEX EQUIPMENT COMPANY, INC., OF NEW YORK, N. Y., A CORPORATION OF DELAWARE.

ELECTRIC REGULATION.

Application filed May 14, 1924, Serial No. 713,238. Renewed December 5, 1927.

My invention pertains to that class of electric regulation wherein it is desired to automatically control a source of electrical potential difference in a predetermined manner and has for its principal object to provide simple and effective means whereby such a source will be automatically controlled, as will hereinafter be more fully pointed out.

As my invention is particularly applicable to electric systems wherein a variable speed dynamo or generator is used to charge a storage battery and operate lamps or other translating devices in conjunction therewith which are maintained by the said battery when the generator is inoperative, which systems are now widely used for the lighting of railway cars by power derived from the axle, it will be described with respect to such a system.

In the drawing, Fig. I is a diagrammatic representation of one type of system embodying the essentials of my invention; and Fig. II shows a modification which may be made in the system of Fig. I.

Referring particularly to Fig. I, 1 represents the source of controllable potential difference, in this instance indicated as the commutator of a variable speed dynamo or generator having its positive brush connected by the lead 2 with the positive side of the storage battery 3 and the positive terminals of the lamps or other translating devices indicated at 4. The battery and translating devices have their negative terminals connected with the wire 5 which is led to one side of a suitable automatic switch 6 the opposite side of which is connected as by the wire 7 with one end of the coil or winding 8, the opposite end of which is connected by the wire 9 with the negative brush of the generator.
Switch 6, the mere presence of which is here indicated, is preferably of the automatic variety adapted to close its circuit when the voltage of the source is substantially equal to that of the storage battery 3 and to open its circuit when the voltage of the source falls very slightly below that of the battery in such manner as to prevent back discharge from the battery through the source. As these switches are now well-known in the art the details of construction are omitted for the sake of clearness in illustration.

The generator is shown as provided with the usual shunt coil 10 having in series therewith a regulating element, in this instance indicated as a carbon pile 11, and it will therefore be evident that the electrical operation of the generator may be controlled by proper manipulation of the pressure upon the pile 11. The said pile has one end resting against the stationary abutting member 12 while the opposite end has pressure exerted thereupon through the instrumentality of the bell-crank lever, comprising the short arm 13 and the long arm 14, which is pivotally supported as indicated at 15 and provided with a movable weight indicated at 16, or other suitable means of adjustment, as will hereinafter be more fully brought out. 17 is a core of iron or other magnetic material, in this instance indicated as pivotally connected with the lever 14 so that motion imparted to the said core 17 will affect the pressure upon the pile 11 by moving lever 14 smoothly against the action of the dashpot arrangement indicated at 21. 18 is a sleeve or hollow core, of iron or other magnetic material, within the coil 8 and has its opposite ends connected as by the members 19, of iron or other magnetic material, so as to form a substantially closed magnetic circuit for the coil 8. 20 is a shunt or voltage coil across the generator tending, when energized, to raise the core 17 and reduce the pressure upon the pile 11. 22 is an adjustable shunt which may be used to divert as much of the current as desired away from the coil 8 for the purpose of adjustment.

In Fig. II like numerals are used to indicate like parts, and the only modifications intended to be brought out by the use of this figure are the coil 23 which is shown as in series with the battery circuit only and therefore responsive to the battery current alone, as distinguished from coil 8 in the main circuit of Fig. I; and the air gaps indicated at 24 which may be introduced in the magnetic circuit of the coil 8, if desired, for the purpose of adjustment; and a division of the core 17 into magnetically separate parts.

An operation of my invention is substantially as follows, referring particularly to Fig. I:

If the dynamo 1 be at rest or operating at sufficiently low speed, switch 6 will be open and the lamps or other translating devices 14 may be maintained by the battery 3 in a well-known manner. If, now, the generator speed be increased until its voltage exceeds that of the storage battery 3, switch 6 will be closed and current will be supplied by the generator through wire 2 to the battery 3 and translating devices 4, from which return will be made through wire 5, switch 6, wire 7, coil 8 and wire 9 to the generator, and, if the shunt 22 be used, a portion of the returned current will be carried thereby and therefore diverted from the coil 8. The current circulating in the coil 8 will set up a magnetic flux which will flow through the hollow core 18 and, leaving one end thereof, enter the yokes or paths 19 and return therethrough to the opposite end of the hollow core 18; and, so long as the magnetic parts 18 and 19 remain quite below saturation, the current in the coil 8 will produce little, if any, appreciable regulating effect upon the core 17 which, while the generator is supplying a moderate current to the lamps or battery, may therefore be controlled substantially by the action of coil 20 alone. The operation of this coil 20 I preferably so adjust, as for example through the instrumentality of weight 16, that when the voltage across the generator reaches a desired predetermined limit coil 20 will raise the core 17 and, by reducing the pressure upon the pile 11, hold this desired maximum voltage from being exceeded throughout speed changes of the generator. And I usually prefer to choose this voltage as substantially equal to the voltage of the battery 3 when the same is fully charged so that, if the coil 8 be producing substantially no effect upon the core 17 and the battery be in a relatively well charged condition and its voltage, therefore, near that limited by the coil 20, a desirable charging current will be supplied to the battery 3; and this current will taper off and gradually approach zero as the battery voltage rises and approaches its fully charged value, and it will therefore be noted that overcharging will be eliminated. The arrangement of the coil 8 and its associated magnetic members 18—19, in practice, is such that current flowing through the coil 8, so long as below a predetermined value, will not materially interfere with the operation of the core 17 by the coil 20 but will cause the mere circulation of the magnetic flux through members 18—19, as above pointed out. However, the above-mentioned parts are so designed and arranged that when a predetermined desired maximum current is flowing in the coil 8, as may be adjusted by means of the shunt 22, the parts 18—19 will be substantially saturated, and even a relatively slight increase in current in the coil 8 will then affect the core 17 and, by cooperating with the coil 20, cause the said core to be raised and the pressure upon the pile 11 decreased in such manner as to prevent this desired maximum current from being exceeded. And, therefore, the battery 3 will never be charged at an injurious rate, even though its voltage be quite low, as when in a discharged condition, as the current output will always be limited through the instrumentality of the coil 8 and its cooperating parts, notwithstanding the coil 8 will have a small or substantially negligible effect upon the operation of the coil 20 and its cooperating parts, so long as the current output remains below a preselected desirable limit.

The operation of that modification indicated in Fig. II may be plainly followed from the above, it being only necessary to note that it is the battery circuit current that is limited by the coil 23, in the manner that the main circuit current is limited by the coil 8 in the description of Fig. I, and that a larger current may be caused to be necessary in the coil 23 in order to cause saturation of the parts 18—19, if the air gaps, as indicated at 24, be employed, on account of the said gaps raising the reluctance of the magnetic circuit which, therefore, will not become saturated unless the magnetomotive force is relatively increased which, in this case, will mean more current in the coil 23, as may be adjusted within reasonable limits by adjustment of the length of the said air gaps 24. And, if the core 17 be divided into separate parts, as indicated in this figure, the coil 23 may be caused to mechanically assist the coil 20, as distinguished from magnetically assisting it as shown in Fig. I.

From the foregoing it will be noted that I have produced a system, of a simple and rugged type, wherein the voltage of the generator may be automatically held constant within very narrow limits throughout speed changes and that during such regulation the current output will have little, if any, appreciable effect upon the voltage regulation until such current output tends to exceed a predetermined limit whereupon it may be caused to affect the regulator in such manner that this limit cannot be appreciably exceeded, and that this action is brought about without any separately movable parts affected by the current coil.

Further, it will be noted that, in the accompanying drawing, I have shown the coil 20 in the form of an ordinary solenoid which may, if desired, be provided with any suitable type of magnetic circuit, as is well understood in the art; and that I have shown this coil above the coil 8 and simply indicated the coils in this position for the sake of clearness in illustration, it being remembered that the drawing is a mere diagrammatic representation intended to illustrate the principles of my invention.

I do not wish in any way to limit myself to any of the details of construction or relative relation of coils indicated in the drawing or to any of the exact modes of operation which have been given merely to illustrate diagrammatically or schematically one embodiment of my invention which is as set forth in the following claims:

1. An electric regulator comprehending a regulating element, voltage responsive means for operating the same, current responsive means for affecting the operation of said element and means lessening the effect of and depending upon the current through said responsive means for determining the point of operation of said responsive means.

2. An electric regulator comprehending a regulating element, voltage responsive means for operating the same, current responsive means adapted to affect said element when the current therethrough tends to exceed a predetermined limit including weakening means the effect of which is determined by the degree of saturation thereof.

3. The combination with a variable speed generator, of a regulator therefor comprehending means for affecting the electric operation of the generator, and responsive means for operating the above-mentioned means including a magnetic circuit tending to render said responsive means substantially inoperative until said circuit is substantially magnetically saturated.

4. The combination with a variable speed generator and a regulating device for controlling the same, of voltage responsive means for controlling said device and current responsive means for affecting the control of said device including a diverting magnetic circuit determining by its relative saturation when the regulation shall be affected thereby.

5. The combination with a variable speed generator, a regulating device for controlling the same and a storage battery charged by said generator, of means for controlling said regulating device in response to voltage fluctuations incident to charging said battery, and responsive means affected by current supplied to the said battery when above a predetermined value and magnetic diverting means depending upon the saturation thereof for determining said value.

JOHN L. CREVELING.